(12) United States Patent
Lynch et al.

(10) Patent No.: US 9,379,999 B2
(45) Date of Patent: Jun. 28, 2016

(54) AUDIO POWER BASED MEDIA BANDWIDTH MANAGEMENT

(71) Applicant: Avaya Inc., Basking Ridge, NJ (US)

(72) Inventors: John Lynch, Belleville (CA); Jon Bentley, New Providence, NJ (US); Parameshwaran Krishnan, Basking Ridge, NJ (US); Peter Tarle, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 99 days.

(21) Appl. No.: 14/500,630

(22) Filed: Sep. 29, 2014

(65) Prior Publication Data

US 2016/0094475 A1    Mar. 31, 2016

(51) Int. Cl.
| | |
|---|---|
| *H04N 7/14* | (2006.01) |
| *H04L 12/911* | (2013.01) |
| *H04L 29/06* | (2006.01) |
| *H04N 7/15* | (2006.01) |

(52) U.S. Cl.
CPC ............ *H04L 47/783* (2013.01); *H04L 65/602* (2013.01); *H04N 7/15* (2013.01)

(58) Field of Classification Search
CPC ........................................................ H04N 7/14
USPC .............. 348/14.01, 14.08, 14.12; 379/93.21, 379/158, 202.01
See application file for complete search history.

(56) References Cited

U.S. PATENT DOCUMENTS

| | | | |
|---|---|---|---|
| 7,768,543 B2* | 8/2010 | Christiansen | H04L 29/06027 348/14.08 |
| 9,118,940 B2* | 8/2015 | Valentine | H04N 7/152 |
| 9,143,728 B2* | 9/2015 | Hartung | H04N 7/15 |
| 2013/0077538 A1* | 3/2013 | Plotnikov | H04L 12/1822 370/260 |
| 2015/0030149 A1* | 1/2015 | Chu | H04M 3/568 379/202.01 |

* cited by examiner

*Primary Examiner* — Olisa Anwah

(57) ABSTRACT

Embodiments disclosed herein provide systems, methods, and computer readable media for managing bandwidth based on audio power level. In a particular embodiment, a method includes receiving a media stream from a first client device, wherein the media stream includes an audio stream. During receipt of the media stream, the method provides determining whether an audio power level of the audio stream satisfies criteria for inclusion in an output media stream from the media server system along with one or more media streams received from one or more other client devices. Upon determining that the criteria is not satisfied, the method provides transferring a first notification to the first client device that includes a first instruction for the first client device to reduce an amount of bandwidth used for transferring the media stream.

20 Claims, 5 Drawing Sheets

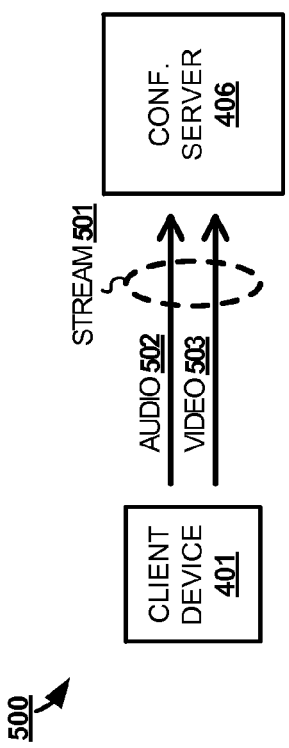
Figure 5
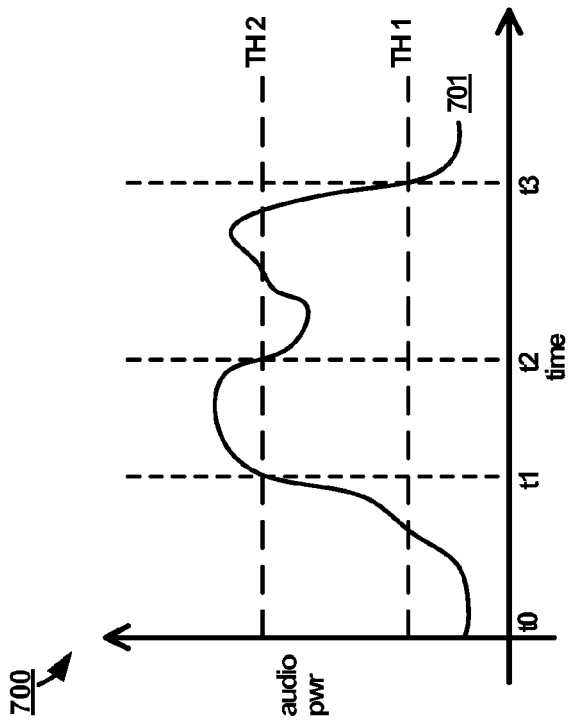
Figure 6
Figure 7

AUDIO POWER BASED MEDIA BANDWIDTH MANAGEMENT

TECHNICAL BACKGROUND

Media server systems, such as conferencing systems, receive media streams from client devices, compile those media streams into at least one output media stream for each conference, and transfer the output stream back to the client devices. A server system may facilitate audio communications, video communications, or both, along with other accompanying media, such as textual media, graphical media, and the like—including combinations thereof. When real-time communications are transferred over packet communication networks, the media streams through which the communications are transferred may use high priority bandwidth in order to ensure the communications occur smoothly. Specifically, high priority bandwidth allows the real time communications to be received by and transferred from a media server system in a timely manner. Customers will pay a premium for this high priority bandwidth to ensure that user experience does not suffer due to delays in transporting communications data through the network.

OVERVIEW

Embodiments disclosed herein provide systems, methods, and computer readable media for managing bandwidth based on audio power level. In a particular embodiment, a non-transitory computer readable storage medium is provided having instructions stored thereon that, when executed by a media server system, direct the media server system to perform a method of media bandwidth management. The method includes receiving a media stream from a first client device, wherein the media stream includes an audio stream. During receipt of the media stream, the method provides determining whether an audio power level of the audio stream satisfies criteria for inclusion in an output media stream from the media server system along with one or more media streams received from one or more other client devices. Upon determining that the criteria is not satisfied, the method provides transferring a first notification to the first client device that includes a first instruction for the first client device to reduce an amount of bandwidth used for transferring the media stream.

In some embodiments, after transferring the first notification and upon determining that the criteria is satisfied, the method provides transferring a second notification to the first client device that includes a second instruction for the first client device to increase the amount of bandwidth used for the media stream.

In some embodiments, the criteria comprise an upper threshold and a lower threshold and wherein the criteria is satisfied when the audio power level exceeds the upper threshold and the criteria is not satisfied when the audio power level is below the lower threshold.

In some embodiments, each packet carrying the audio stream includes an indicator of the audio power level of the audio stream within the packet.

In some embodiments, the media stream further comprises a video stream corresponding to the audio stream and wherein, in response to the first instruction, the client device transfers the video stream at a lower quality than is currently being used.

In some embodiments, the first client device, in response to the first instruction, transfers silence packets in place of the audio stream.

In some embodiments, the first client device, in response to the first instruction, transfers the audio stream at a lower quality than is currently being used.

In some embodiments, the first client device transfers the audio stream at the lower quality by marking packets of the audio stream as having a lower quality of service than is currently being used.

In another embodiment, a media server system is provided for performing media bandwidth management. The media server system comprises a communication interface configured to receive a media stream from a first client device, wherein the media stream includes an audio stream. The media server system further comprises a processing system configured to, during receipt of the media stream, determine whether an audio power level of the audio stream satisfies criteria for inclusion in an output media stream from the media server system along with one or more media streams received from one or more other client devices. The communication interface is further configured to, upon determining that the criteria is not satisfied, transfer a first notification to the first client device that includes a first instruction for the first client device to reduce an amount of bandwidth used for transferring the media stream.

In yet another embodiment, a non-transitory computer readable storage medium is provided having instructions stored thereon that, when executed by a client device, direct the client device to perform a method of media bandwidth management. The method includes transferring a media stream to a media server system, wherein the media stream includes an audio stream. Upon the media server system determining that an audio power level of the audio stream does not satisfy criteria for inclusion in an output media stream from the media server system along with one or more media streams received from one or more other client devices, the method provides receiving a first notification from the media server system that includes a first instruction for the client device to reduce an amount of bandwidth used for transferring the media stream. In response to the first instruction, the method provides reducing the amount of bandwidth used for transferring the media stream.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 5 illustrates an exemplary subset of an operational scenario for managing bandwidth based on audio power level in an implementation.

FIG. 6 illustrates a method of operating a video conferencing system for managing bandwidth based on audio power level.

FIG. 7 illustrates a graph of a moving average audio power level versus time in an implementation.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The various embodiments disclosed herein provide for managing bandwidth of a media stream based on audio power level. In many cases, data communication customers pay a premium for prioritizing certain data sent over data communication networks. For example, data for real-time communication sessions may be prioritized in order to ensure that the real-time communication sessions proceed with higher quality than would otherwise be provided (for e-mail, for instance). However, sometimes the data may not include information that needs to be prioritized. In these situations, limiting the use of high-priority bandwidth for sending that non-priority information may help limit the cost, monetary or otherwise, that a customer pays for using the high-priority bandwidth.

In particular, during receipt of a media stream for a real-time communication not all of the media being streamed needs to be presented at a receiving endpoint of the media stream. For example, during a conference call, audio is captured and streamed from one participant to other participants on the call and from those participants back to the one participant. If that one participant is not speaking, and thereby not contributing to the conference, over periods during call, then audio from the participant need not be presented to the other participants during those periods. Since the audio from those periods does not need to be presented, the use of high-priority bandwidth to transfer the audio is not necessary. Therefore, measures are taken to reduce the high-priority bandwidth used for the audio from the one participant during the silence, or near silence, periods. It should be understood that speaking, not speaking, silence, near silence, etc. are merely meant to describe conditions that may satisfy the audio power level criteria described herein. Thus, even though a participant may be mumbling in one example, the mumbling may be low enough as to not trigger the criteria for inclusion in the output stream.

Figure 1:
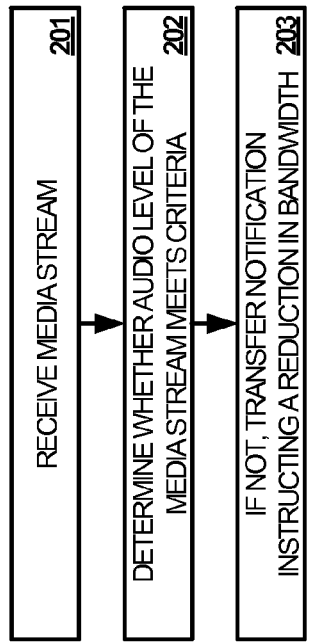
FIG. 1 illustrates an operational scenario for managing bandwidth based on audio power level in an implementation.

FIG. 1 illustrates an operational scenario 100 for managing bandwidth based on audio power level. Operational scenario 100 includes client device 101 and media server system 102. Client device 101 includes communication circuitry for wireless communication, wired communication, or both, and processing circuitry. Client device 101 may be a personal computer, smartphone, tablet, set-top box, room media system, or any other computing device that is capable of capturing and transferring audio for a media stream. Media server system 102 also includes communication circuitry for wireless communication, wired communication, or both, and processing circuitry. Media server system 102 may comprise a media server, conferencing server, client device, or any other computing system capable of receiving a media stream and generating an output media stream. Media server system 102 may reside in a single device or may be distributed across multiple devices.

In operational scenario 100, a media stream is transferred to media server system 102 from client device 101 at step 1. The media stream includes at least an audio stream component comprising data representing audio captured by client device 101. For example, the media stream may be an audio stream, as would be the case in an audio conference call, or may be a video stream having a corresponding audio stream, as would be the case in a video conference call. The media stream may further include additional components, such as presentation slides, desktop view streams, or any other type of media. The media stream is transferred over a communication link that may include wireless communication link(s), wired communication link(s), communication networks, or other communication systems and devices—including combinations thereof. Though not shown, media server system 102 may also receive media streams from additional client devices.

As media server system 102 receives the media stream from client device 101, media server system 102 compiles the media stream into an output media stream at step 2. The output media stream is transferred from media server system 102 to client devices, which may include client device 101. The output media stream may include multiple output media streams that are tailored for respective receiving client devices, may be a single output stream received by all client devices, or some devices may receive a tailored output stream while other devices share one or more common output streams. In some examples, the output media stream comprises multiple received media streams transferred individually for compiling at a receiving client while, in other examples, media server system 102 compiles the received media streams into a single media stream before transfer. For example, audio media streams may be received from multiple client devices and those audio streams may either be transmitted individually in the output media stream or may be combined into a single audio stream by media server system 102 before transmission. Other methods of generating an output media stream from received media streams can also be used.

As media server system 102 receives the media stream from client device 101 and transfers the output media stream, media server system 102 determines the audio power level of the media stream received from client device 101 at step 3. Generally, louder audio corresponds to higher power levels, which may be expressed in watts, decibels (power relative to a reference power), or any other type of units for expressing power. Audio power level may be a total audio power level or may be a power level relative to a baseline, such as background noise. Media server system 102 may determine the audio power level itself or may receive an indication of the audio power level along with the media stream. For example, audio of the media stream may be transported using data packets and the audio power level of the audio contained within each packet may be indicated within the data packet, either as a header extension or otherwise.

Media server system 102 uses the determined audio power level to determine whether the audio warrants inclusion within the output media stream. Specifically, if the audio power level at any given point during receipt of the media stream satisfies criteria, such as may be defined by one or more power level thresholds, then media server system 102 will include the corresponding portion of the audio stream in the output media stream. However, if the audio power level does not satisfy the criteria, then the corresponding portion of the audio stream will not be included in the output media stream. Thus, portions of the audio stream switch between satisfying and not satisfying the criteria over time, and media server system 102 includes the audio stream and does not include the audio stream in the output media stream accordingly.

Upon media server system 102 determining that the audio power level does not satisfy the criteria for inclusion in the output media stream, media server system 102 at step 4 transfers a notification to client device 101 that includes an instruction to reduce the amount of bandwidth used for transferring the media stream. In response to the instruction, client device 101 reduces the bandwidth used to transfer the media stream at step 5. The bandwidth may be reduced by sending silence packets, which use less bandwidth than normal audio packets and are easy to discard, marking the audio packets as having a lower quality of service (QoS), reducing the quality of the audio stream's encoding, or any other means of lessening bandwidth usage.

In some cases, such as marking the packets with a lower QoS, the audio stream packets will still use the same amount of overall bandwidth. However, a lower QoS indicates that the packets do not need to be transmitted over high priority bandwidth thereby reducing the amount of high priority bandwidth used by the client device 101 to transfer the media stream. Thus, in these cases, even though the audio stream won't be included in the output media stream, media server system 102 will still receive all of the audio for other use, such as recording the media stream.

Advantageously, if media server system 102 determines that it will not be using the audio stream from client 101 in the output media stream, then media server system 102 can instruct client device 101 to reduce the amount of bandwidth used to send the media stream, which helps lessen bandwidth costs for transferring media stream data from client device 101 to media server system 102. Once the audio power level increases enough to satisfy the criteria for inclusion in the output media stream, then media server system 102 may send another notification to client device 101 instructing client device 101 to increase the bandwidth used to transfer the media stream. This situation requires that media server 102 is still aware of the audio power level captured by client device 101 even if only silence packets are being sent from client device 101 (e.g. headers of the silence packets may still indicate the power level of audio that would have otherwise been carried therein). Alternatively, client device 101 may be aware of the criteria used by the media server system 102 and increase the bandwidth when client device 101 determines that the audio stream satisfies the criteria. For example, media server system 102 may indicate criteria for increasing bandwidth in media server system 102's instruction to reduce bandwidth.

In some embodiments, the instruction from media server system 102 to reduce bandwidth applies to components of the media stream, if any, other than just the audio stream. For example, the audio stream may be the audio corresponding to a video stream captured by client device 101. Upon receiving the instruction from media server system 102 to reduce the bandwidth used by client device 101 to transfer the media stream, client device 101 may refrain from transferring the video stream component of the media stream, may mark the video packets (if separate from the audio packets) as having a lower QoS, may reduce the quality of the video stream's encoding (e.g. lowering resolution), or any other means of lessening bandwidth usage of a video stream. Therefore, if media server system 102 determines that the audio power level should also affect the corresponding video's inclusion in the output media stream, then media server system 102 can reduce the bandwidth used for transferring the video stream as well from client device 101.

Figure 2:
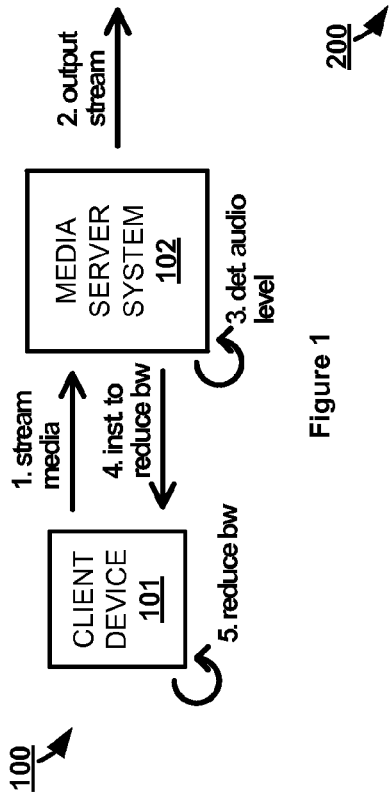
FIG. 2 illustrates a method of operating a media server system for managing bandwidth based on audio power level.

FIG. 2 illustrates a method 200 for adaptive media system 102 to manage bandwidth based on audio power level. Method 200 includes receiving a media stream from client device 101 (step 201). The media stream from client device includes at least an audio stream. One or more media streams from one or more other client devices may also be received. The media stream may include audio, video, or any other type of media—including combinations thereof. Received media streams are compiled into an output media stream including one or more output stream for each participating client device.

During receipt of the media stream, method 200 provides determining whether an audio power level of the audio stream satisfies criteria for inclusion in an output media stream from media server system 102 along with the one or more media streams received from one or more other client devices (step 202). As noted above, the criteria may include one or more power level thresholds. For example, a power level threshold below which the audio stream would not be included in the output media stream may be lower than a power level threshold above which the audio stream will be included in the output media stream. Arranging power level thresholds in this manner helps to alleviate cases where audio power levels continually drop below and rise above a single threshold. The power level thresholds may be consistent across all client devices or may differ between two or more client devices based on each device's audio characteristics (e.g. background noise level, captured audio quality, typical voice level of a participant at a client device, etc.).

Upon determining that the criteria is not satisfied, method 200 provides transferring a first notification to client device 101 that includes a first instruction for the client device 101 to reduce an amount of bandwidth used for transferring the media stream (step 203). The notification may be a dedicated data message or may be included within other information transferred from media server system 102 to client device 101. The instruction may indicate a specific means for reducing the amount of bandwidth (e.g. sending silence packets, marking the packets with a lower QoS, etc.), client device 101 may be able to determine the means for reducing bandwidth on its own, client device 101 may already have standing instructions indicating the bandwidth reduction means, or some other arrangement for determining means for reducing bandwidth.

Figure 3:
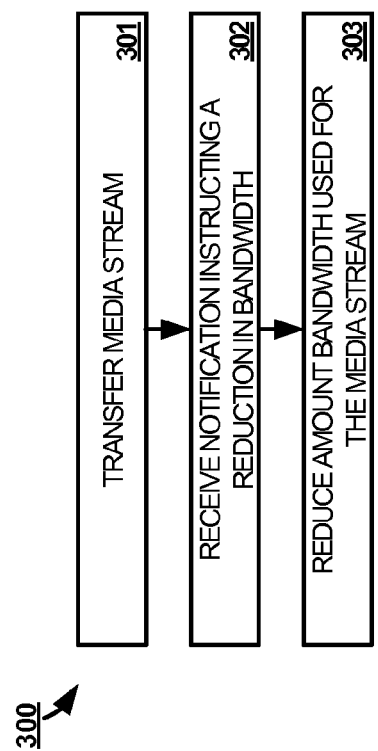
FIG. 3 illustrates a method of operating a client device for managing bandwidth based on audio power level.

FIG. 3 illustrates a method 300 for client device 101 to manage bandwidth based on audio power level. Method 300 includes transferring a media stream to media server system 102 (step 301). As in method 200, the media stream includes an audio stream. The media transferred in the media stream may include media captured by client device 101 or media that is otherwise stored on client device 301 for transmission in the media stream, such as a video or presentation slide accompanying a real-time communication with other client devices. Preferably, the audio stream included in the media stream comprises real-time audio information captured by client device 101.

Upon media server system 102 determining that an audio power level of the audio stream does not satisfy criteria for inclusion in an output media stream from the media server system along with one or more media streams received from one or more other client devices, method 300 provides receiving a first notification from the media server system that includes a first instruction for the client device to reduce an amount of bandwidth used for transferring the media stream (step 302). In response to the first instruction, method 300 provides reducing the amount of bandwidth used for transferring the media stream (step 303).

Client device 101 may reduce the amount of overall bandwidth or may reduce the amount of high priority bandwidth. If the media stream comprises media in addition to the audio stream, such as a video stream component, then client device 101 may only reduce the amount of bandwidth used to transfer the audio stream or may also reduce the amount of bandwidth used to transfer at least a portion of the additional media. In some cases, client device 101 may reduce the amount of bandwidth used to transfer the additional media instead of the audio stream.

Figure 4:
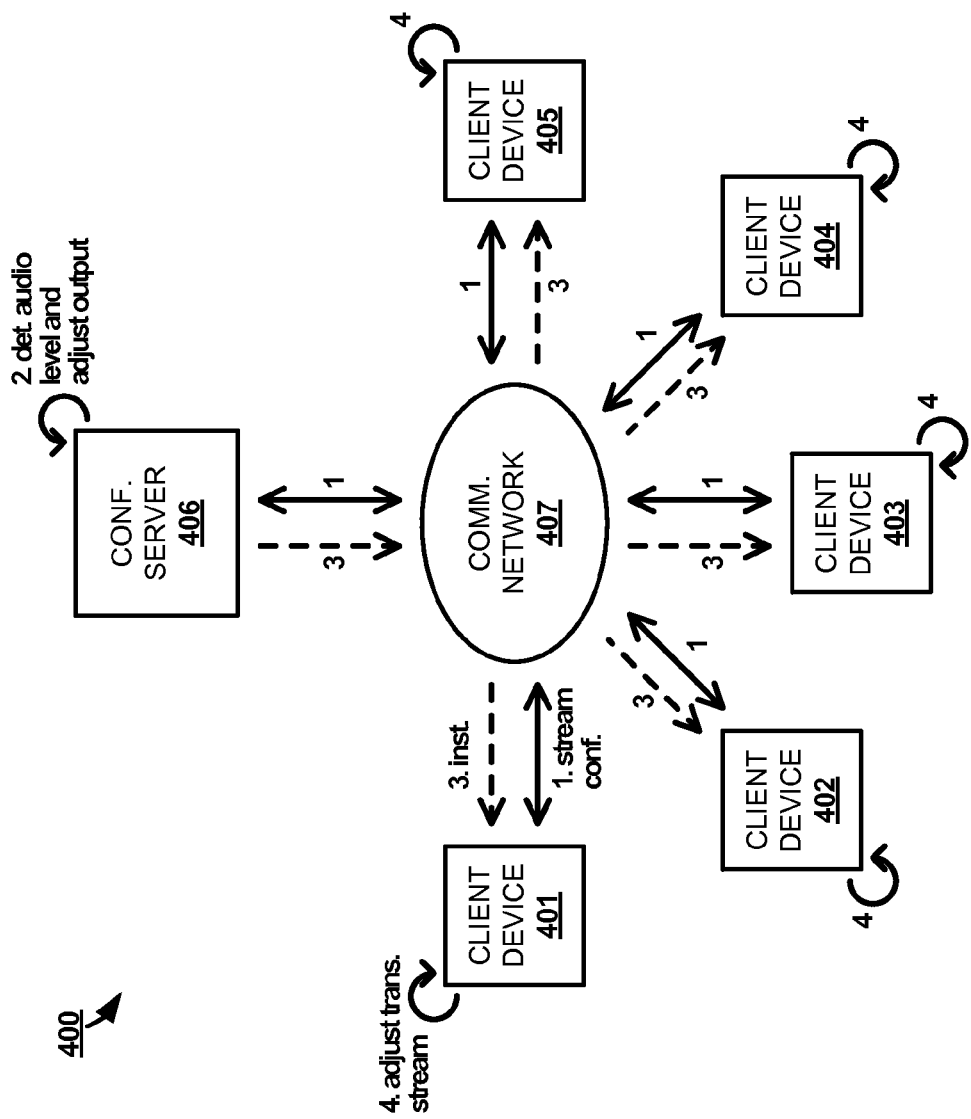
FIG. 4 illustrates an operational scenario for managing bandwidth based on audio power level in an implementation.

FIG. 4 illustrates an operational scenario 400 for managing bandwidth based on audio power level. Operational scenario 400 includes client devices 401-405, video conferencing server 406, and communication network 407. Client devices 401-405 each include communication circuitry for wireless communication, wired communication, or both, and processing circuitry. Each of client devices 401-405 may be a personal computer, smartphone, tablet, set-top box, room media system, or any other computing device that is capable of capturing and transferring audio for a media stream. Video conferencing server 406 also includes communication circuitry for wireless communication, wired communication, or both, and processing circuitry configured to facilitate video conferencing sessions between a plurality of client devices.

Communication network 407 comprises network elements that provide communications services to client devices 401-405 and video conferencing server 406. Communication network 407 may comprise switches, wireless access nodes, Internet routers, network gateways, application servers, computer systems, communication links, or some other type of communication equipment—including combinations thereof. Communication network 407 may be a single network, such as a local area network, a wide area network, or the Internet, or may be a combination of multiple networks.

In operational scenario 400, a video conference between client devices 401-405 is initiated and streamed between client devices 401-405 through video conferencing server 406 at step 1. The video conference comprises a real-time communication wherein both audio and video of participants are captured by a client device. Additionally, a video conference may include other media, such as presentation slides, for purposes of presenting that media in relation to the conference. The video conference may use various encoding and transport protocols.

During step 1, which is ongoing throughout the video conference session, audio and video are captured by each of client devices 401-405 of their respective participants. A media stream comprising the captured audio and video is transferred from each client device 401-405 to video conferencing server 406. Specifically, FIG. 5 illustrates a more detailed subset of operational scenario 400 between client device 401 and video conferencing server 406. Media stream 501 is being transferred from client device 401 to video conferencing server 406. Media stream 501 includes both audio stream component 502 and video stream component 503. The media streams transferred from client devices 402-405 include similar audio and video components.

Referring back to operational scenario 400, video conferencing server 406 compiles the audio and video received from client devices 401-405 into an output audio and video stream, which is transferred back to client devices 401-405. Each of clients 401-405 may receive the same output stream or may receive output streams tailored to each device. For example, a client device does not necessarily need its received output stream to include the audio and video transferred from that same client device.

While the video conferencing session is ongoing, conferencing server continually monitors the current audio power level of the audio streams received from each of client devices 401-405 as part of step 2. When the audio power level of a media stream falls below a threshold, video conferencing system 406 adjusts the output stream based on the audio power level being below the threshold. For example, if a participant is not speaking, then the audio power level may fall below the threshold. Accordingly, video conferencing server 406 does not need to include that participant's silence in the output media stream and removes that participant's audio stream accordingly.

Video conferencing system 406 also notifies the source of the audio stream (i.e. one of client devices 401-405) at step 3 with an instruction that the amount bandwidth used to transmit the media stream should be reduced. As noted above, the amount of bandwidth used by the audio component may be reduced by sending silence packets, reducing a QoS for the packets carrying the stream, or some other means for reducing bandwidth—including combinations thereof. Continuing the example from above, since the audio stream is not being included in the output media stream, the amount of bandwidth (either total or high priority) used to transfer the media stream from the source client device can be reduced without affecting the output media stream. Therefore, at step 4, client devices 401-405 comply with any instructions to adjust the amount of bandwidth used to transfer their respective media streams to video conferencing server 406.

Additionally, at step 2, video conferencing system 406 adjusts the video included in the output stream based on the power level of the corresponding audio. Generally, this means that upon determining that the audio for a media stream received from a client device is below the threshold for inclusion in the output media stream, the video received from that client device is either adjusted to reduce bandwidth in the output stream or removed from the output stream all together. For example, if a participant from client device 402 is no longer speaking, then the audio power level received from client device 402 will decrease below the predefined threshold. If the system shows only the current speaker using high resolution video, the video of a participant that is no longer speaking can be reduced in quality. Thus, video conferencing system 406 reduces the quality of that video in the output stream or, in some cases, removes the video from the output stream entirely.

Some examples of video conferencing system 406 provide multiple levels of bandwidth reduction for the video stream component of the output media stream. In a specific example, video conferencing system 406 may use a larger, higher resolution video stream for whichever client device has a participant that is speaking at a given moment. Two additional client device video streams may also be displayed in smaller, lower resolution video frames. These additional video streams may correspond to the most recent speakers on the conference other than a current speaker or may be selected based upon some other policy of video conferencing system 406. In the context of client devices 401-405, this means that at least one device's video stream is not displayed. In such cases, video conferencing system 406 determines which client device's video should be displayed in the smaller frames based on which client device's corresponding audio stream was most recently above the threshold for inclusion in the output media stream. That is, if a participant at client device 403 is speaking and thereby causing his or her captured audio to meet the audio power level criteria for inclusion, then video conferencing server 406 uses the video stream of client device 403 as the larger video. The two smaller video frames may then be selected as the video streams from the two client devices having audio streams that most recently met the audio power level criteria for inclusion. Or course, video conferencing system 406 may employ other logic for determining which video stream to include in which frame, including logic to account for two or more audio streams meeting the inclusion criteria at the same time.

Regardless of which video stream(s) video conferencing system 406 determines should be included in the output stream and at which quality, video conferencing system 406 includes instructions for client devices 401-405 to adjust their video streams accordingly in the notification at step 3. The video bandwidth adjustment instructions may be included in the same notification as the audio adjustment instructions or may be transferred separately. To comply with an instruction to reduce bandwidth of the video stream component of the media stream at step 4, a client device may reduce the resolution of the video stream it transfers, may reduce the quality of the video in some other way (such as by decreasing the frame rate or image quality), may stop transferring the video stream if video conferencing system 406 determines that the client device's video will not be used at all, may mark packets carrying the video stream as having a lower QoS, or may use some other means for reducing the amount of bandwidth used by a video stream—including combinations thereof.

It should be further understood that, using steps 2-4, also applies to instructing respective client devices 401-405 to increase bandwidth of the media stream upon determining that the audio power level being received by a device increases to satisfy the criteria for inclusion in the output media stream. This allows for audio stream, and corresponding video stream, bandwidth usage to increase or decrease depending upon whether a participant at a respective client device 401-405 is speaking during the video conference. In some cases, video conferencing system 406 transfers a notification to a client device upon determining that the device's media stream bandwidth should be increased, the notification instructing the client device to increase bandwidth accordingly. In alternative examples, the video conferencing system 406 transfers a message to the client devices indicating the audio power level threshold above which bandwidth should be increased and the client device is therefore able to increase the bandwidth upon the threshold being exceeded without needing an instruction from video conferencing system 406. This latter scenario prevents undue delay in the transfer of higher quality audio and video from the client devices caused by network delay.

In a particular example, referring back to FIG. 5, audio stream 502 may first meet video conferencing server 406's criteria for inclusion in the output media stream because its user participant is currently speaking. Video stream 503 is also included and at high resolution. When the participant stops speaking and another device's participant begins, the power level of audio stream 502 will no longer meet the inclusion criteria and client device 401 is instructed to reduce the amount of bandwidth used to transfer audio stream 502 and video stream 503. In this case, client device 401 begins to transfer silence packets in audio stream 502, reduces the resolution of video stream 503, and marks the packets transferring stream 501 as having low QoS. At a later point in time, video conferencing system 406 may no longer include video stream 503 in the output media stream due to the participant's prolonged period of not talking. Thus, client device 401 may further receive an instruction to stop transferring video all together. It should be understood that other methods for reducing video bandwidth may also be used and may depend upon the policies that video conferencing system 406 uses to determine how individual video streams are included in the output streams.

Eventually, the participant at client device 401 speaks again and client device 401 begins transmitting the captured audio instead of silence packets in audio stream 502 and begins to transfer video stream 503 at high resolution. Client device 401 may take these actions in response to its own determination that media stream 501 will now be included in the output media stream of video conferencing system 406 or may receive a notification with instructions to do so from video conferencing system 406. Video conferencing server 406 may continue to receive audio power level information from client device 401, even when client device 401 is transferring silence packets, in order to determine whether the audio power level of audio stream 502 meets the criteria for inclusion in the output media stream.

The above processes may repeat itself multiple times for each of client devices 401-405 until the video conference is ended. The process is performed independently for each client device 401-405 and video conferencing server 406 is therefore able to manage bandwidth of media streams from each device on an independent basis. This is able to account for any number of the client devices having speaking or non-speaking participants. In some examples, the processes above may be combined with voice activity detection (VAD). VAD may decrease the likelihood that an audio stream will be included in the output media stream simply due to a spike in ambient noise.

FIG. 6 illustrates a method 600 for managing bandwidth based on audio power level. With reference to the elements of FIG. 4, method 600 provides establishing a video conference session between client devices 401-405 through video conferencing server 406 (step 601). During the video conference, method 600 provides continually monitoring the power level of the audio stream components of the media stream transferred from each of client devices 401-405 (step 602). Method 600 provides for configuring the output conference media stream from video conferencing server 406 based on the audio power levels (step 603). That is, audio and video streams from each of client devices 401-405 are included or excluded based on the whether their respective audio stream power levels meet criteria for inclusion in the output stream. Client devices 401-405 are instructed throughout the video conference to adjust the amount of bandwidth used to transfer their respective media streams based on the determined composition of the output media stream (step 604). In other words, depending on the method of reducing bandwidth, at least an amount of high priority bandwidth used by a client device is reduced if the composition of the output stream renders the client device's media stream less important (e.g. will not be used or otherwise does not require the highest quality transmission).

FIG. 7 illustrates an example graph 700 of moving average audio power level versus time. Audio power level curve 701 is an example of at least a portion of the power level captured by a client device for inclusion in an audio stream. Threshold 1 and threshold 2 represent the criteria used by a media server system to determine whether the audio should be included in an output media stream. Generally, if the audio power level is above threshold 2, then the audio is included in the output stream and, if the audio power level is below threshold 1, then the audio is not included in the output stream. As discussed above, these audio thresholds may also be used to determine how and whether corresponding video is included in the output stream.

Power level curve 701 begins at time t0 below threshold 1 and the audio is therefore not included in an output media stream. Also, during this time below threshold 1, the audio stream may be transferring using a low amount of bandwidth. Just before time t1, curve 701 exceeds threshold 1. However, the audio is not included in the output stream until the curve 701 exceeds threshold 2 at time t1 and the transferring client device will increase media stream bandwidth accordingly. At time t2, the curve drops below threshold 2 but, since curve 701 remains above threshold 1, the audio is still included in the output media stream. Once curve 701 drops below threshold 1 at time t3, the audio is no longer included in the output stream and the transferring client device is instructed to reduce the amount of bandwidth used accordingly.

Figure 8:
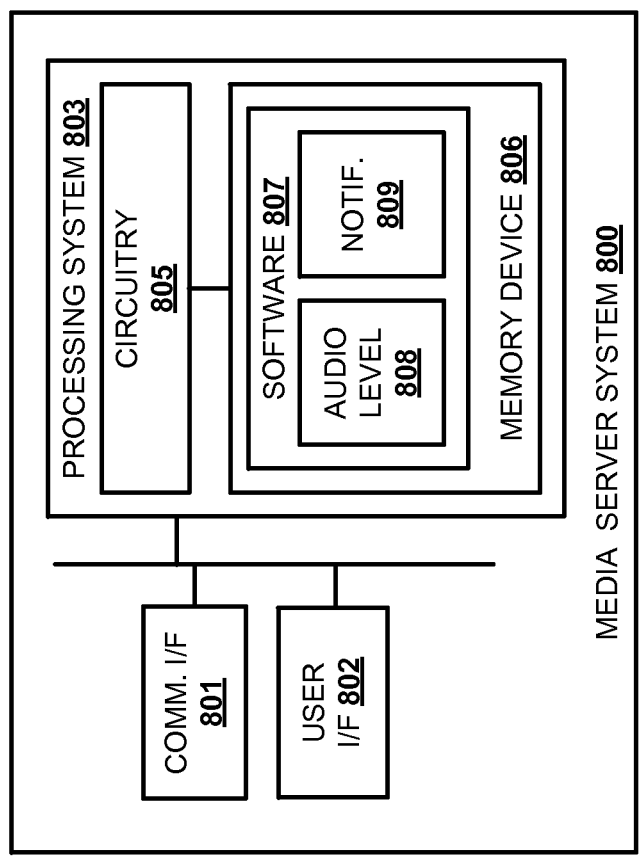
FIG. 8 illustrates a computing architecture for implementing media server system.

FIG. 8 illustrates media server system 800. Media server system 800 is an example of media server system 102, although media server system 102 may use alternative configurations. Media server system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes audio level module 808 and notification module 809. Operating software 807 may further include an operating system, utilities, drivers, network interfaces, applications, or some other type of software. When executed by circuitry 805, operating software 807 directs processing system 803 to operate media server system 800 as described herein.

In particular, operating software 807 directs processing system 803 to receive a media stream from a first client device via communication interface 801, wherein the media stream includes an audio stream. During receipt of the media stream, audio level module 808 directs processing system 803 to determine whether an audio power level of the audio stream satisfies criteria for inclusion in an output media stream from the media server system along with one or more media streams received from one or more other client devices. Upon determining that the criteria is not satisfied, notification module 809 directs processing system 803 to transfer a first notification to the first client device that includes a first instruction for the first client device to reduce an amount of bandwidth used for transferring the media stream.

Figure 9:
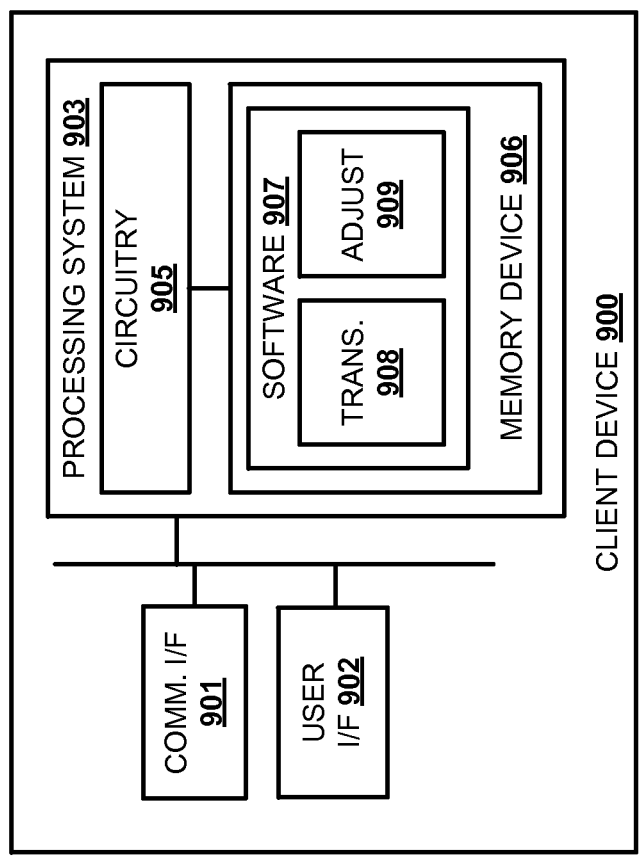
FIG. 9 illustrates a computing architecture for implementing a client device.

FIG. 9 illustrates client device 900. Client device 900 is an example of client device 101, although device 101 could use alternative configurations. Client device 900 comprises communication interface 901, user interface 902, and processing system 903. Processing system 903 is linked to communication interface 901 and user interface 902. Processing system 903 includes processing circuitry 905 and memory device 906 that stores operating software 907. Client device 900 may include other well-known components such as a battery and enclosure that are not shown for clarity. Client device 900 may be a telephone, computer, e-book, mobile Internet appliance, media player, game console, wireless network interface card, conference room system, or some other communication apparatus—including combinations thereof.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Processing circuitry 905 is typically mounted on a circuit board that may also hold memory device 906 and portions of communication interface 901 and user interface 902. Operating software 907 comprises computer programs, firmware, or some other form of machine-readable processing instructions. Operating software 907 includes stream transfer module 908 and stream adjustment module 909. Operating software 907 may further include an operating system, utilities, drivers, network interfaces, applications, or some other type of software. When executed by processing circuitry 905, operating software 907 directs processing system 903 to operate client device 900 as described herein.

In particular, stream transfer module 908 directs processing system 903 to transfer a media stream to a media server system, wherein the media stream includes an audio stream. Upon the media server system determining that an audio power level of the audio stream does not satisfy criteria for inclusion in an output media stream from the media server system along with one or more media streams received from one or more other client devices, operating software 907 directs processing system 903 to receive, via communication interface 901, a first notification from the media server system that includes a first instruction for client device 900 to reduce an amount of bandwidth used for transferring the media stream. In response to the first instruction, stream adjustment module 909 directs processing system 903 to reduce the amount of bandwidth used for transferring the media stream.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer readable storage medium having instructions stored thereon that, when executed by a media server system, direct the media server system to perform a method of media bandwidth management, the method comprising:

receiving a media stream from a first client device, wherein the media stream includes an audio stream;

during receipt of the media stream, determining whether an audio power level of the audio stream satisfies criteria for inclusion in an output media stream from the media server system along with one or more media streams received from one or more other client devices;

upon determining that the criteria is not satisfied, transferring a first notification to the first client device that includes a first instruction for the first client device to reduce an amount of bandwidth used for transferring the media stream.

2. The computer readable storage medium of claim 1, wherein the method further comprises:

after transferring the first notification and upon determining that the criteria is satisfied, transferring a second notification to the first client device that includes a second instruction for the first client device to increase the amount of bandwidth used for the media stream.

3. The computer readable storage medium of claim 1, wherein the criteria comprise an upper threshold and a lower threshold and wherein the criteria is satisfied when the audio power level exceeds the upper threshold and the criteria is not satisfied when the audio power level is below the lower threshold.

4. The computer readable storage medium of claim 1, wherein each packet carrying the audio stream includes an indicator of the audio power level of the audio stream within the packet.

5. The computer readable storage medium of claim 1, wherein the media stream further comprises a video stream corresponding to the audio stream and wherein, in response to the first instruction, the client device transfers the video stream at a lower quality than is currently being used.

6. The computer readable storage medium of claim 1, wherein the first client device, in response to the first instruction, transfers silence packets in place of the audio stream.

7. The computer readable storage medium of claim 1, wherein the first client device, in response to the first instruction, transfers the audio stream at a lower quality than is currently being used.

8. The computer readable storage medium of claim 7, wherein the first client device transfers the audio stream at the lower quality by marking packets of the audio stream as having a lower quality of service than is currently being used.

9. A media server system for performing media bandwidth management, the media server system comprising:

a communication interface configured to receive a media stream from a first client device, wherein the media stream includes an audio stream;

a processing system configured to, during receipt of the media stream, determine whether an audio power level of the audio stream satisfies criteria for inclusion in an output media stream from the media server system along with one or more media streams received from one or more other client devices; and the communication interface further configured to, upon determining that the criteria is not satisfied, transfer a first notification to the first client device that includes a first instruction for the first client device to reduce an amount of bandwidth used for transferring the media stream.

10. The media server system of claim 9, further comprising:

the communication interface configured to, after transferring the first notification and upon determining that the criteria is satisfied, transfer a second notification to the first client device that includes a second instruction for the first client device to increase the amount of bandwidth used for the media stream.

11. The media server system of claim 10, wherein the criteria comprise an upper threshold and a lower threshold and wherein the criteria is satisfied when the audio power level exceeds the upper threshold and the criteria is not satisfied when the audio power level is below the lower threshold.

12. The media server system of claim 9, wherein each packet carrying the audio stream includes an indicator of the audio power level of the audio stream within the packet.

13. The media server system of claim 9, wherein the media stream further comprises a video stream corresponding to the audio stream and wherein, in response to the first instruction, the client device transfers the video stream at a lower quality than is currently being used.

14. The media server system of claim 9, wherein the first client device, in response to the first instruction, transfers silence packets in place of the audio stream.

15. The media server system of claim 9, wherein the first client device, in response to the first instruction, transfers the audio stream at a lower quality than is currently being used.

16. The media server system of claim 15, wherein the first client device transfers the audio stream at the lower quality by marking packets of the audio stream as having a lower quality of service than is currently being used.

17. A non-transitory computer readable storage medium having instructions stored thereon that, when executed by a client device, direct the client device to perform a method of media bandwidth management, the method comprising:

transferring a media stream to a media server system, wherein the media stream includes an audio stream;

upon the media server system determining that an audio power level of the audio stream does not satisfy criteria for inclusion in an output media stream from the media server system along with one or more media streams received from one or more other client devices, receiving a first notification from the media server system that includes a first instruction for the client device to reduce an amount of bandwidth used for transferring the media stream; and in response to the first instruction, reducing the amount of bandwidth used for transferring the media stream.

18. The computer readable storage medium of claim 17, wherein the method further comprises:

receiving a notification from the media server system indicating the criteria;

after reducing the amount of bandwidth used for transferring the media stream, determining that the criteria is satisfied; and upon determining that the criteria is satisfied, increasing the amount of bandwidth used for transferring the media stream.

19. The computer readable storage medium of claim 17, further comprising:
  determining the audio power level of the audio stream within each packet that carries the audio stream; and
  including an indicator of the audio power level within each packet when transferring the audio stream.

20. The computer readable storage medium of claim 17, wherein the media stream further comprises a video stream corresponding to the audio stream and wherein reducing the amount of bandwidth used for transferring the media stream comprises reducing a quality of the video stream.

\* \* \* \* \*